US012743893B2

(12) United States Patent
Cheng

(10) Patent No.: US 12,743,893 B2
(45) Date of Patent: Sep. 22, 2026

(54) ROAD OBSTACLE DETECTION METHOD AND APPARATUS, AND DEVICE AND STORAGE MEDIUM

(71) Applicants: SENSETIME GROUP LIMITED, Hong Kong (CN); HONDA MOTOR CO., LTD., Tokyo (JP)

(72) Inventor: Guangliang Cheng, Hong Kong (CN)

(73) Assignees: SENSETIME GROUP LIMITED, Hong Kong (CN); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/890,842

(22) Filed: Sep. 20, 2024

(65) Prior Publication Data

US 2025/0014355 A1 Jan. 9, 2025

Related U.S. Application Data

(63) Continuation of application No. PCT/CN2022/128942, filed on Nov. 1, 2022.

(30) Foreign Application Priority Data

Mar. 24, 2022 (CN) ........................ 202210303623.0

(51) Int. Cl.
*G06V 20/58* (2022.01)
*G06V 10/26* (2022.01)
(Continued)

(52) U.S. Cl.
CPC .............. *G06V 20/58* (2022.01); *G06V 10/26* (2022.01); *G06V 20/588* (2022.01);
(Continued)

(58) Field of Classification Search
CPC ...... G06V 20/58; G06V 10/26; G06V 20/588; B60W 2555/60; B60W 60/001; B60W 2552/10; B60W 2420/403; B60V 20/58
(Continued)

(56) References Cited

U.S. PATENT DOCUMENTS

| | | | | |
|---|---|---|---|---|
| 11,565,698 | B2 * | 1/2023 | Mori | G06V 10/758 |
| 2010/0017060 | A1 * | 1/2010 | Zhang | G01S 17/89 356/3 |

(Continued)

FOREIGN PATENT DOCUMENTS

| | | | |
|---|---|---|---|
| CN | 107454969 | A | 12/2017 |
| CN | 109891349 | A | 6/2019 |

(Continued)

OTHER PUBLICATIONS

Office Action cited in JP2024-553393, mailed Jul. 29, 2025, 8 pages.

(Continued)

*Primary Examiner* — Khoi H Tran
(74) *Attorney, Agent, or Firm* — Cooper Legal Group, LLC

(57) ABSTRACT

A method for detecting an anomalous object on a road is provided. In the method, an image of the road is acquired; a travelable region and an ideal travelable region in the image of the road are determined based on the image of the road; and an anomalous object region on the road is determined based on the travelable region and the ideal travelable region. An apparatus for detecting an anomalous object on a road and a storage medium are also provided.

11 Claims, 10 Drawing Sheets

(51) Int. Cl.
*G06V 20/56* (2022.01)
*B60W 60/00* (2020.01)

(52) U.S. Cl.
CPC ..... *B60W 60/001* (2020.02); *B60W 2420/403* (2013.01); *B60W 2552/10* (2020.02); *B60W 2555/60* (2020.02)

(58) Field of Classification Search
USPC ...................................................... 701/26, 28
See application file for complete search history.

(56) References Cited

U.S. PATENT DOCUMENTS

2010/0098295 A1* 4/2010 Zhang .................... G08G 1/167 348/148
2014/0086477 A1* 3/2014 You .......................... G06T 7/50 382/154
2018/0113450 A1* 4/2018 Sherony .......... B60W 30/18163
2019/0065867 A1* 2/2019 Huang .................. G06V 20/56
2019/0156129 A1 5/2019 Kakegawa et al.
2019/0303692 A1 10/2019 Nan et al.
2019/0315350 A1 10/2019 Oguro et al.
2020/0104612 A1 4/2020 Chen et al.
2020/0302192 A1 9/2020 Ogata et al.
2020/0391745 A1 12/2020 Mori et al.
2021/0256274 A1 8/2021 Kumano et al.
2025/0010854 A1* 1/2025 Cheng .................. G06V 10/764
2025/0244138 A1* 7/2025 Lerner ............... G01C 21/3896

FOREIGN PATENT DOCUMENTS

CN 111937002 A 11/2020
CN 113297939 A 8/2021
CN 113468941 A 10/2021
CN 113642453 A 11/2021
CN 113792583 A 12/2021
JP 2015016799 A 1/2015
JP 2019066333 A 4/2019
JP 2021128612 A 9/2021
WO 2018016394 A1 1/2018

OTHER PUBLICATIONS

International Search Report cited in PCT/CN2022/128942, mailed Jan. 12, 2023, 4 pages.
Chinese Office Action cited in CN202210303623.0, mailed Mar. 18, 2025, 14 pages.

* cited by examiner

ROAD OBSTACLE DETECTION METHOD AND APPARATUS, AND DEVICE AND STORAGE MEDIUM

CROSS-REFERENCE TO RELATED APPLICATIONS

This application is a continuation of International Patent Application No. PCT/CN2022/128942, filed on Nov. 1, 2022, which claims priority to Chinese patent application No. 202210303623.0, filed on Mar. 24, 2022. The disclosures of International Patent Application No. PCT/CN2022/128942 and Chinese patent application No. 202210303623.0 are hereby incorporated by reference in their entireties.

BACKGROUND

In autonomous driving systems, anomalous objects are usually identified by using object detection manners. Because the shapes and locations of the anomalous objects are unknown, a large amount of sample data is needed, which causes large difficulty and low accuracy in the detection of anomalous objects.

SUMMARY

Embodiments of the disclosure relate to the technical field of intelligent driving, and relate to, but are not limited to, a method and an apparatus for detecting an anomalous object on a road, a device and a storage medium.

Embodiments of the present disclosure provide a technical solution for detecting an anomalous object on a road.

The technical solution of the embodiments of the present disclosure is implemented as follows.

An embodiment of the present disclosure provides a method for detecting an anomalous object on a road, which includes the following operations. An image of the road is acquired. A travelable region and an ideal travelable region in the image of the road are determined based on the image of the road. An anomalous object region on the road is determined based on the travelable region and the ideal travelable region.

An embodiment of the present disclosure provides an apparatus for detecting an anomalous object on a road, which includes an image acquisition portion, a traveling region determination portion and an anomalous object region determination portion. The image acquisition portion is configured to acquire an image of the road. The traveling region determination portion is configured to determine a travelable region and an ideal travelable region in the image of the road based on the image of the road. The anomalous object region determination portion is configured to determine an anomalous object region on the road based on the travelable region and the ideal travelable region.

An embodiment of the present disclosure provides a computer storage medium having stored thereon computer-executed instructions that, when executed, cause to implement operations of the above mentioned method.

An embodiment of the present disclosure provides a computer device including: a memory for storing computer-executed instructions; and a processor, configured to execute the computer-executed instructions stored on the memory to implement operations of the above mentioned method.

An embodiment of the present disclosure provides a computer program product including computer programs or instructions that, when executed on an electronic device, cause the electronic device to execute the operations in any one of the possible embodiments of the first aspect described above.

In order to make the above objectives, features and advantages of the embodiments of the present disclosure more obvious and easy to understand, preferred embodiments will be described in detail below with reference to the accompanying drawings.

BRIEF DESCRIPTION OF THE DRAWINGS

To clearly illustrate the technical solutions of the embodiments of the disclosure, a brief introduction to the drawings used in the embodiments will be provided below. These drawings are incorporated into and constitute part of the description. These drawings illustrate embodiments that conform to the disclosure and, together with the description, serve to explain the technical solutions of the disclosure. It should be understood that the following drawings only illustrate some embodiments of the disclosure and thus should not be construed as limiting the scope of the disclosure. For those of ordinary skill in the art, other related drawings can be obtained based on these drawings without creative efforts.

DETAILED DESCRIPTION

Figure 1A:
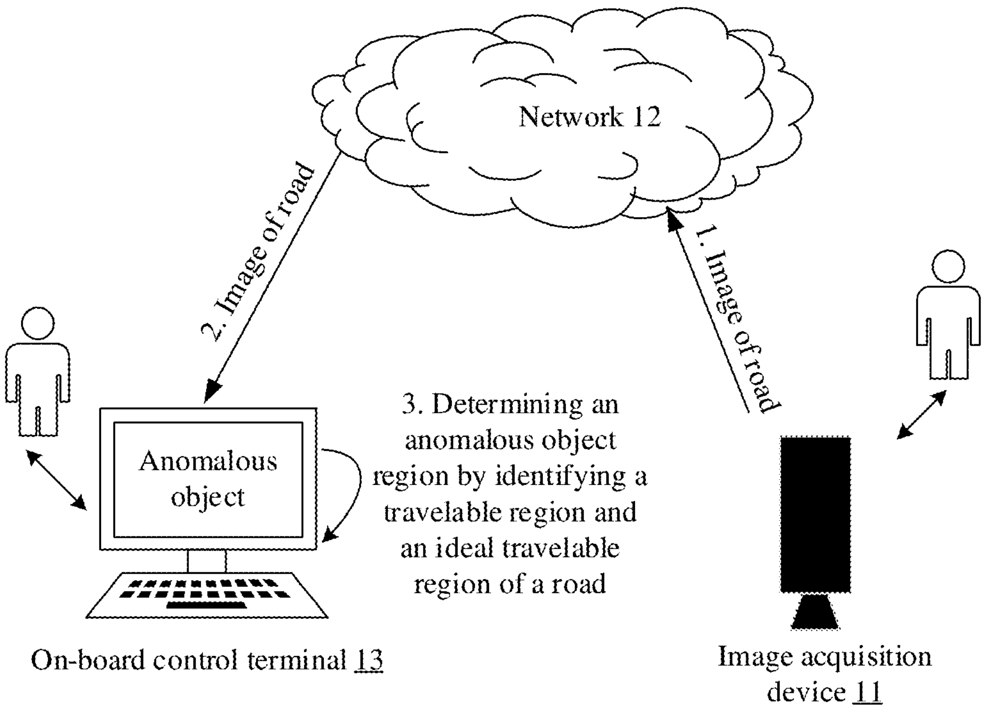
FIG. 1A is a schematic diagram of a system architecture to which a method for detecting an anomalous object on a road according to embodiments of the present disclosure may be applied.

In order to make the above objectives, technical solutions and advantages of the embodiments of the present disclosure more clear, the specific technical solutions of the invention will be described in further detail below with reference to the accompanying drawings in the embodiments of the present disclosure. The following embodiments are used to illustrate the present disclosure, but are not intended to limit the scope of the present disclosure.

In the following description, reference is made to "some embodiments", which describes subsets of all possible embodiments, but it should be understood that "some embodiments" may be the same subset or different subsets of all possible embodiments, and may be combined with each other without conflict.

In the following description, the referred terms "first\second\third" is merely used to distinguish similar objects and does not represent a specific ordering for the objects, and it should be understood that the terms "first\second\third" may, where permitted, be interchanged to denote particular sequences or orders, to enable the embodiments of the present disclosure described in some embodiments to be implemented in an order other than that illustrated or described in some embodiments.

Unless otherwise defined, all technical and scientific terms used herein have the same meaning as commonly understood by those skilled in the art belonging to the present disclosure. The terms used herein are for the purpose of describing embodiments of the present disclosure only, and are not intended to limit the present disclosure.

Before further describing the embodiments of the present disclosure, the referred words and terms in the embodiments of the present disclosure will be described, and the referred words and terms in the embodiments of the present disclosure are applicable to the following explanations.

1) Deep Neural Network (DNN): which is a framework for deep learning, and is a neural network with at least one hidden layer. From the DNN, according to the positions of different layers, the internal neural network layers of the DNN can be divided into three categories including an input layer, a hidden layer and an output layer. As shown in the drawing below, generally speaking, the first layer is the input layer, the last layer is the output layer, and the middle layers are all hidden layers. In an embodiment of the present disclosure, the deep neural network may be used to implement a semantic segmentation task, an object detection task, or the like.
2) Ego vehicle: which is a vehicle containing sensors that sense the surrounding environment. The vehicle coordinate system is anchored to the ego vehicle, where the x-axis points forward from the vehicle, the y-axis points to the left as viewed when the vehicle face forward, and the z-axis points up from the ground to maintain the right-handed coordinate system. The origin of the coordinate system is located on the ground below the midpoint of the rear axle.

Hereinafter, an exemplary application in which the method for detecting an anomalous object on a road provided by the embodiments of the present disclosure is applied to an electronic device will be described. The electronic device provided by the embodiments of the present disclosure may be an on-board device, a cloud platform, or other computer device. Exemplarily, the on-board device may be a thin client, a thick client, a microprocessor-based system, a mini-computer system, and the like installed on the vehicle, and the cloud platform may be a distributed cloud computing technology environment that includes a mini-computer system or a mainframe computer system, and the like. Hereinafter, an exemplary application in which the electronic device is implemented as a terminal or a server will be described.

FIG. 1A is a schematic diagram of a system architecture of a method for detecting an anomalous object on a road according to embodiments of the present disclosure. As shown in FIG. 1A, the system architecture includes an image acquisition device 11, a network 12 and an on-board control terminal 13. In order to support an exemplary application, a communication connection is established between the image acquisition device 11 and the on-board control terminal 13 through the network 12. First, the image acquisition device 11 reports the acquired image of a road to the on-board control terminal 13 through the network 12, and the on-board control terminal 13 identifies a travelable region and an ideal travelable region in the road image, and determines an anomalous object region on the road based on the two regions.

As an example, the image acquisition device 11 may include a vision processing device having a vision information processing capability. The network 12 may adopt a wired or wireless manner. When the image acquisition device 11 is a vision processing device, the on-board control terminal 13 may be communicatively connected to the vision processing device in a wired manner, for example, the data communication is performed via a bus.

Alternatively, in some scenarios, the image acquisition device 11 may be a vision processing device with a video acquisition module, which may be a host computer with a camera(s). At this time, the augmented reality data display method according to the embodiment of the present disclosure may be executed by the image acquisition device 11, and the above-described system architecture may not include the network 12 and the on-board control terminal 13.

In order to make the above objectives, technical solutions and advantages of the embodiments of the present disclosure more clear, the specific technical solutions of the invention will be described in further detail below with reference to the accompanying drawings in the embodiments of the present disclosure. The following embodiments are used to illustrate the present disclosure, but are not intended to limit the scope of the present disclosure.

In the following description, reference is made to "some embodiments", which describes subsets of all possible embodiments, but it should be understood that "some embodiments" may be the same subset or different subsets of all possible embodiments, and may be combined with each other without conflict.

The method may be applied to a computer device, and the functions realized by the method can be implemented by a processor in the computer device invoking a program code, and the program code may be stored in a computer storage medium. It can be seen that the computer device includes at least a processor and a storage medium.

Figure 1B:
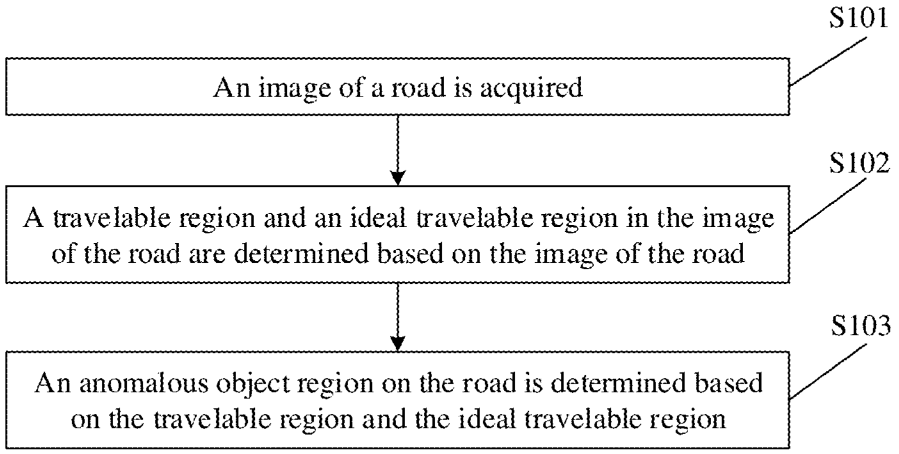
FIG. 1B is a schematic flowchart of an implementation of a method for detecting an anomalous object on a road according to embodiments of the present disclosure.

FIG. 1B is a schematic flowchart of an implementation of a method for detecting an anomalous object on a road according to embodiments of the present disclosure. As shown in FIG. 1B, it is described with reference to operations shown in FIG. 1B.

At operation S101, an image of the road is acquired.

In some embodiments, the image of the road may be an image acquired for any road, may be an image including complex picture contents, or an image including simple picture contents. For example, the image of the road is an image of a road captured by an image acquisition device on a vehicle.

In some embodiments, the image acquisition device may be mounted on an on-board device of the vehicle, or may be independent of the on-board device. The on-board device may be communicatively connected to sensors, a positioning device of the vehicle, or the like. The on-board device may acquire data collected by the sensor of the vehicle, geographical location information reported by the positioning device, or the like, through the communication connection. Exemplarily, the sensor of the vehicle may be at least one of millimeter wave radar, a lidar, a camera or other devices. The positioning device may be a device for providing a positioning service based on at least one of the following positioning systems: a Global Positioning System (GPS), a Beidou satellite navigation system, or a Galileo satellite navigation system.

In some embodiments, the on-board device may be an Advanced Driving Assistant System (ADAS), the ADAS is provided on the vehicle, the ADAS may acquire real-time position information of the vehicle from the positioning device of the vehicle, and/or the ADAS may acquire image data, radar data, and the like representing environmental information around the vehicle from the sensors of the vehicle. Here, optionally, the ADAS may transmit vehicle travelling data including the real-time position information of the vehicle to the cloud platform, and thus, the cloud platform may receive the real-time position information of the vehicle and/or the image data representing environment information around the vehicle, radar data, and the like.

The image of the road is obtained by an image acquisition device (i.e., a sensor, such as a camera) installed on the vehicle, and the image acquisition device collects images around the vehicle in real time along with the movement of the vehicle to obtain the image of the road. In some possible implementations, while the vehicle is traveling, a camera(s) installed on the vehicle may collect the road on which the vehicle is traveling and the surrounding environment to obtain the image of the road.

At operation S102, a travelable region and an ideal travelable region in the image of the road are determined based on the image of the road.

In some embodiments, the vehicle-related road may be a road on which the vehicle is currently traveling. The travelable region and the ideal travelable region may be independently determined. Alternatively, the ideal travelable region may be determined based on the travelable region. Taking the independently determining the travelable region and the ideal travelable region as an example, the image of the road is input to a trained neural network, and semantic segmentation is performed on the image of the road by using different branch networks of the neural network to obtain the travelable region and the ideal travelable region on the road. The neural network may be a neural network for semantic segmentation, and the travelable region in the image of the road is detected by the neural network. The travelable region represents a road region on which the vehicle can travel. The image of the road usually further includes other vehicles, pedestrians, trees, road edges, and the like in addition to the current vehicle, and for example, the regions on which the other vehicles, pedestrians, trees, and road edges are located are regions where the current vehicle cannot travel. Therefore, by performing semantic segmentation on the image of the road, the regions on which for example other vehicles, pedestrians, trees, and road edges are located may be removed from the image of the road, and the travelable region for the vehicle is obtained. The ideal travelable region is a real road region where the vehicle can travel on the road surface assuming that there are no vehicles, pedestrians, or objects on the road surface. In this way, the coverage area of the ideal travelable region is larger than the coverage area of the travelable region. Alternatively, the ideal travelable region includes the travelable region on the road.

At operation S103, an anomalous object region on the road is determined based on the travelable region and the ideal travelable region.

In some embodiments, the anomalous object region of the road is a region on which any type of anomalous object that affects normal travel of the vehicle is located, such as regions on which other vehicles, pedestrians, trees, etc. other than the vehicle, are located on the road.

In some possible implementations, in the image of the road, after the travelable region and the ideal region of the road are identified from the road on which the vehicle is located, the overlapping portion and the non-overlapping portion between the two regions are obtained by comparing the two regions. An overlapping region between the travelable region and the ideal travelable region is a road region that exists in both the travelable region and the ideal travelable region, indicating that the overlapping region is a real road region of the road. The overlapping region is a region on which vehicles on the road can travel, and further, it is indicated that there is no anomalous object in the overlapping region. The non-overlapping region between the travelable region and the ideal travelable region is a region that exists in the ideal travelable region and does not exist in the travelable region, indicating that the non-overlapping region is a region on which the vehicles cannot travel, and further, it is indicated that the non-overlapping region is a region where an anomalous object(s) exists, that is, i.e., the anomalous object region on the road.

In the embodiments of the present disclosure, by detecting an acquired image of a road, a travelable region and an ideal travelable region in the image of the road are identified. By comparing the travelable region and the ideal travelable region, an anomalous object region where anomalous objects with any shape on the road are located can be effectively determined. In this way, by comparing the travelable region and the ideal travelable region, the anomalous object region on the road can be quickly identified, and the stability of identifying the anomalous objects with different shapes is improved.

In some embodiments, the travelable region can be obtained not only by inputting the image of the road to the first network, but also the travelable region in the image of the road can be identified by comparing picture information of the image of the road with picture information of a preset image of the road. That is, the operation of determining the travelable region in the image of the road based on the image of the road in the above operation S101 can be implemented by the following operations.

At a first operation, an image region for which a similarity between a texture of the image region and characterization information of road texture is greater than a preset similarity threshold is determined in the image of the road.

In some embodiments, the information of road texture may be a road surface image obtained by collecting the road on which the vehicle can travel, or may be an image region whose picture picked out from the image of the road is a road.

In some possible implementations, by extracting texture features of the image of the road, a texture feature with higher similarity to the characterization information of the road texture are queried among the extracted texture features, and an image region corresponding to the texture feature is determined.

At a second operation, the image region is determined as the travelable region.

In some embodiments, by determining an image region having a higher similarity to the picture information of the preset image of the road in the image of the road, it is indicated that the picture in the image region has a higher similarity to the picture information of the preset image of the road, and further, it is further indicated that the picture in the image region is a road surface, that is, the image region is the travelable region for the vehicle. In this way, by identifying the image region whose image information has a higher similarity to characterization information of road texture from the image of the road as the travelable region, the identification of the travelable region has lower complexity and is easy to implement.

In some embodiments, the ideal travelable region can be obtained not only by inputting the image of the road to a neural network (for example, the first network), but also it may be obtained by identifying road edges of a vehicle-related road, and a region surrounded by the road edge is determined as the ideal travelable region. That is, the operation of determining the ideal travelable region based on the image of the road in the above operation S101 can be implemented by the following operations.

At a third operation, a road edge in the image of the road is determined by detecting the image of the road.

In some embodiments, a third network is employed to identify a road edge of the road, and the road edge in the road image is determined. The third network may be any network for performing road edge identification, such as a residual network, a Visual Geometry Group (VGG) network, or the like. The image of the road is inputted into the third network, and feature extraction is performed on the image of the road. Based on the extracted image features, the road edge is identified to determine the road edge of the vehicle-related road.

At a fourth operation, a region surrounded by the road edge is determined as the ideal travelable region.

In some embodiments, the identified road edge may be understood to be the outermost contour of the road, so the region surrounded by the outermost contour is a real road region on the road free of any type of vehicles, pedestrians or objects. Therefore, the road region surrounded by the road edge is regarded as the ideal travelable region, such that the coverage range of the determined ideal travelable region is more comprehensive.

In some embodiments, the ideal travelable region may be determined on the basis of the travelable region, that is, the operation of determining the ideal travelable region based on the travelable region in the above operation S101 may be implemented by the following process.

The ideal travelable region is determined based on the travelable region.

Here, after the travelable region for the vehicle in the image of the road is identified by any one of the manners in the above-described embodiments, on the basis of the travelable region, the travelable region is expanded on the road where it is located, and then the ideal travelable region is determined. In this way, the ideal travelable region is determined on the basis of the travelable region, which enables the ideal travelable region to include the travelable region, so that the anomalous object region determined by comparing the ideal travelable region and the travelable region is more accurate.

In some embodiments, the operation of determining the ideal travelable region based on the travelable region may be implemented through the following operations.

At a first operation, at least one contour of the travelable region is determined.

In some embodiments, since the travelable region is a road surface region obtained by removing other vehicles, objects, and the like on the road from the entire road surface of the road, the travelable region includes multiple holes, and thus, there are multiple contours for the travelable region.

At a second operation, a target contour whose surrounded region has a largest area is determined among the at least one contour.

In some embodiments, for each of the at least one contour, the area of a region surrounded by the contour is determined, and the contour with the largest area is selected as the target contour. The area of the region surrounded by the target contour is the largest, and the target contour can also be understood as the outermost contour of the travelable region in the at least one contour.

At a third operation, a region surrounded by the target contour is determined as the ideal travelable region.

In some embodiments, since the target contour may be the outermost contour of the travelable region, it is reasonable to determine the region surrounded by the target contour as the ideal travelable region. In this way, by identifying multiple contours of the travelable region and setting a region surrounded by the outermost target contour as the ideal travelable region, the implementation process is simple and the accuracy rate of the determined ideal travelable region is high.

In some embodiments, before the region surrounded by the target contour is determined as the ideal travelable region, it is further possible to first analyze whether the region surrounded by the target contour includes two road edges of the road.

That is, before the region surrounded by the target contour is determined as the ideal travelable region, the method further includes the following operation.

It is determined that the region surrounded by the target contour includes two road edges of the road.

In this way, in a case that the region surrounded by the target contour includes two road edges of the road, the region surrounded by the target contour is determined as the ideal travelable region.

In some embodiments, if the region surrounded by the target contour includes two road edges of the road, it means that the surrounding region of the target contour covers the entire road surface of the road, thus making the obtained ideal travelable region more reasonable.

In some embodiments, the above operation S101 may be implemented through the following two manners.

In a first manner, the ideal travelable region may be determined by detecting multiple lanes in the road and analyzing traffic rules corresponding to the lanes. That is, the operation of determining the ideal travelable region based on the image of the road in the above operation S102 may further be implemented through the following operations.

At a first operation, multiple lanes in the image of the road are obtained by detecting the image of the road.

In some embodiments, a detector may be employed to detect lane lines in the image of the road. Based on the detected multiple lane lines, a road region between two adjacent lane lines is regarded as one lane, thereby obtaining multiple lanes. It is also possible to input the image of the road into the trained lane detection network, and the multiple lanes on the road are output directly.

At a second operation, the ideal travelable region is determined based on the plurality of lanes and traffic rules corresponding to the plurality of lanes.

In some embodiments, after the multiple lanes of the road are detected, a road surface signal on each lane (for example, an arrow, a solid line or a dashed line on the road surface, etc.) is obtained, and the meaning expressed by the road surface signal can be determined according to traffic rules. For example, the meaning of a white solid line is a boundary line that prohibits crossing the same-direction roadway. In this way, by determining the region covered by each lane and the traffic rules corresponding to the road surface signal on each lane, the region covered by each lane can be determined. By combining the regions covered by multiple lanes, the real road region where vehicles can travel without anomalous object, i.e., the ideal travelable region, can be determined. In this way, by determining the region surrounded by the lane as the ideal travelable region by performing the lane detection, it can not only enrich the manners of determining the ideal travelable region, but also ensure that the ideal travelable region completely includes the coverage region of each lane, thereby improving the accuracy of determining the ideal travelable region.

In a second manner, through different network branches in the same neural network, semantic segmentation is performed on the real road region of the road in the image of the road and the region where the vehicle can travel, respectively, to obtain the ideal travelable region and the travelable region. That is, the above operation S102 can be implemented by processes as follows.

The travelable region and the ideal travelable region in the image of the road are obtained by performing semantic segmentation on the image of the road.

In some embodiments, firstly, the first network is applied to the image of the road, and semantic segmentation is performed on the road region on which the vehicle can travel in the road to obtain the travelable region. Then, the second network is applied to the image of the road, and semantic segmentation is performed on the real road region of the vehicle-related road to obtain the ideal travelable region. The first network may be any type of trained neural network capable of semantically segmenting the road region on which the vehicle can travel and the road region on which the vehicle cannot travel on the road, or the first network may be a network branch of any neural network. For example, the neural network may be a fully convolutional neural network, a Mask Region Convolutional Neural Network (Mask R-CNN), or a deep neural network, etc. Feature extraction is performed on the image of the road by inputting the image of the road into the first network, and the semantic segmentation is performed on the road region on which the vehicle can travel and the road region on which the vehicle cannot travel in the image of the road based on the extracted image features. In this way, the travelable region in the image of the road can be quickly and accurately identified.

The second network and the first network may be different network branches of the same neural network. The second network may also be any type of trained neural network capable of semantically segmenting the real road region and non-road region on the road. By inputting the image of the road into the second network, the second network semantically segments the real road region and the non-real road region of the road in the image of the road, and the segmented real road region is determined as the ideal travelable region. The real road region may be a road region on which the vehicle can actually travel without any type of object on the road.

The above process may be executed simultaneously in different network branches of the neural network. By inputting the image of the road into the neural network to perform the feature extraction, and inputting the extracted features into the first network and the second network respectively, the road region on which the vehicle can travel in the image of the road is semantically segmented by the first network branch of the neural network to obtain the travelable region. At the same time, the real road region of the road in the image of the road is semantically segmented by the second network branch of the neural network to obtain the ideal travelable region. In this way, the travelable region and the ideal travelable region can be segmented from the image of the road by different network branches in the same neural network, so that the region segmentation can be implemented quickly and accurately.

In the embodiments of the present disclosure, the travelable region and the ideal travelable region are determined in various manners, so that the travelable region and the ideal travelable region for vehicles can be identified with high accuracy in any case.

Figure 2:
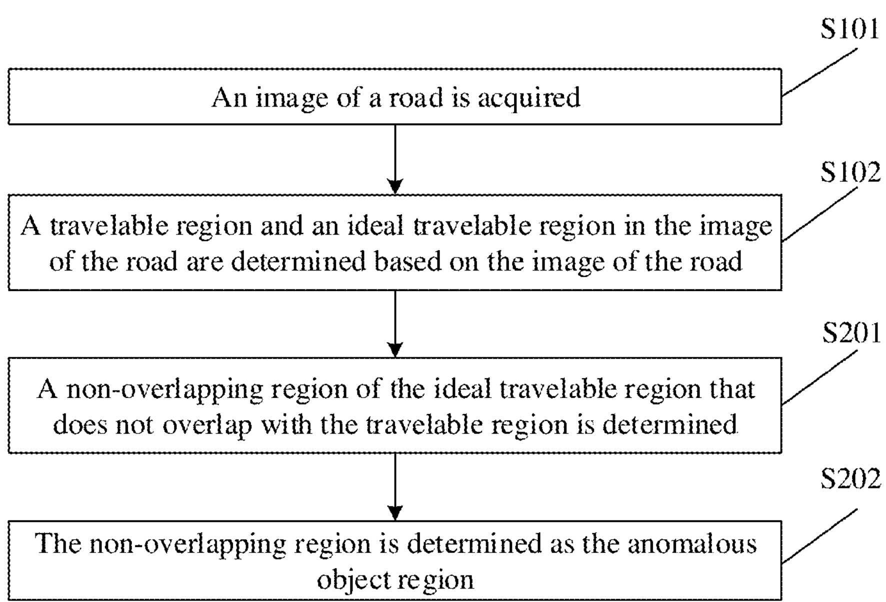
FIG. 2 is a schematic flowchart of another implementation of a method for detecting an anomalous object on a road according to embodiments of the present disclosure.

In some embodiments, the anomalous object region of the road is determined by comparing the non-overlapping regions between the travelable region and the ideal travelable region. That is, the above operation S103 can be implemented by the operations shown in FIG. 2.

At operation S201, a non-overlapping region of the ideal travelable region that does not overlap with the travelable region is determined.

In some embodiments, an overlapping region and a non-overlapping region between the two regions are determined by comparing the ideal travelable region and the travelable region. The overlapping region is a real road region and may be equal to the travelable region. The non-overlapping region between the two regions is a region that exists in the ideal travelable region but does not exist in the travelable region, indicating that the non-overlapping region is a region on which the vehicle cannot travel at present.

At an operation S202, the non-overlapping region is determined as the anomalous object region.

In some embodiments, the region on which the vehicle cannot travel at present (i.e., the non-overlapping region) indicates that there is an anomalous object(s) that affects the normal traveling of vehicles in this region, and the anomalous object may be other vehicles, pedestrians, trees or other objects, etc. In this way, the non-overlapping region is determined as the anomalous object region, so that the anomalous object region affecting the traveling of the vehicles can be accurately detected regardless of the positions and shapes of the anomalous objects, and thus the stability of the anomalous object recognition is improved.

Figure 3:
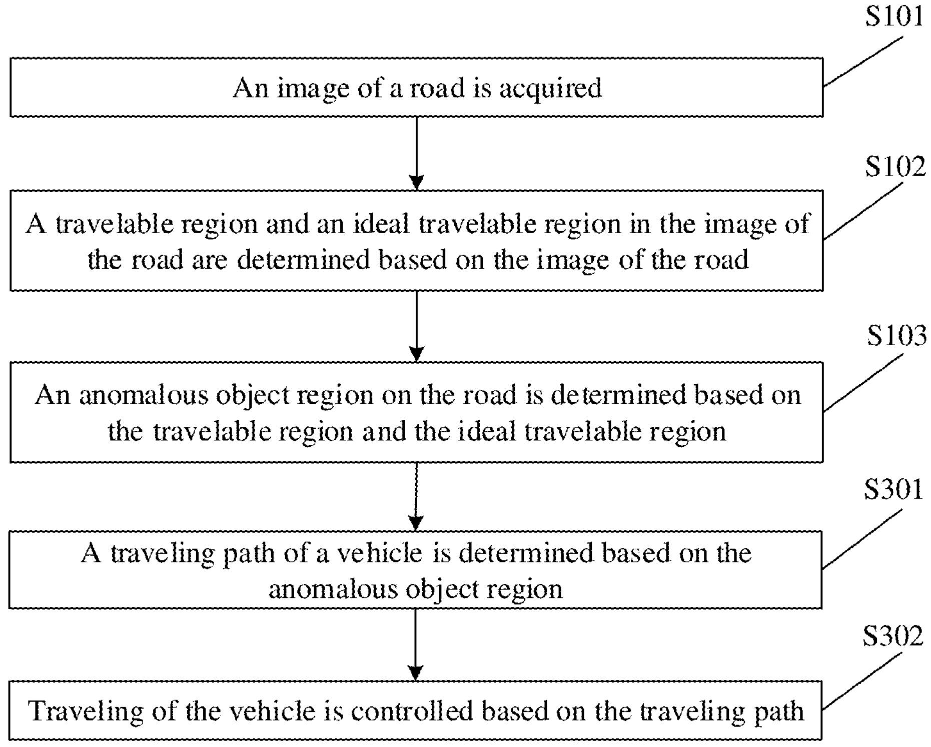
FIG. 3 is a schematic flowchart of yet another implementation of a method for detecting an anomalous object on a road according to embodiments of the present disclosure.

In some embodiments, the path of the vehicle is reformulated based on the detected anomalous object region, so as to control the traveling of the vehicle more effectively. That is, after the operation S103, the operations shown in FIG. 3 are further included.

At operation S301, a traveling path of a vehicle is determined based on the anomalous object region.

In some embodiments, the traveling path includes a traveling speed, a traveling direction, and the like of the vehicle. By analyzing the position of the anomalous object region on the road and the positional relationship between the anomalous object region and the vehicle, the traveling path of the vehicle on the road is reformulated. For example, when the distance between the vehicle and the anomalous object region is relatively close to each other, the vehicle is controlled to prepare for braking or the vehicle is controlled to move away from the anomalous object region.

At operation S302, traveling of the vehicle is controlled based on the traveling path.

In some embodiments, the autonomous driving system of the vehicle may determine the traveling path of the vehicle, and then control the vehicle to travel according to the traveling path.

Through the above operations S301 and S302, after the anomalous object region is identified, the subsequent traveling path is generated in combination with the road information. In this way, the generated traveling path is more accurate, so that the vehicle is accurately controlled by using the traveling path.

Hereinafter, an exemplary application of the embodiments of the present disclosure in an actual application scenario will be described, and it is described by taking the use of a deep neural network to determine the turning of a vehicle at a road intersection based on a road sign as an example.

Great progress has been made in the field of autonomous driving, which is dominated by deep learning, including the fields of image segmentation and object detection. However, the autonomous driving is a holistic system, and the output of a perception module serves the subsequent modules. For example, the perception result not only includes whether there is an object ahead, but also needs to provide relevant logic output for the subsequent modules, to provide certain control signals and logic signals for autonomous driving.

In the method for detecting an anomalous object on a road provided by the embodiments of the present disclosure, by determining a non-overlapping region of an ideal travelable region and a travelable region and performing an anomalous object detection from the perspective of semantic segmentation, the anomalous objects with irregular shapes and indefinite positions can be effectively identified, and the distance between the anomalous objects and vehicles can be effectively evaluated, so that effective information can be provided for a subsequent decision planning control module of an autonomous driving system.

In the method for detecting an anomalous object on a road provided by the embodiments of the present disclosure, a deep learning method is used to obtain a travelable region and an ideal travelable region for an autonomous driving vehicle, and the travelable region and the ideal travelable region are used to obtain a general anomalous object detection result on a road surface, thereby providing effective signals for subsequent path planning in autonomous driving.

Figure 4:
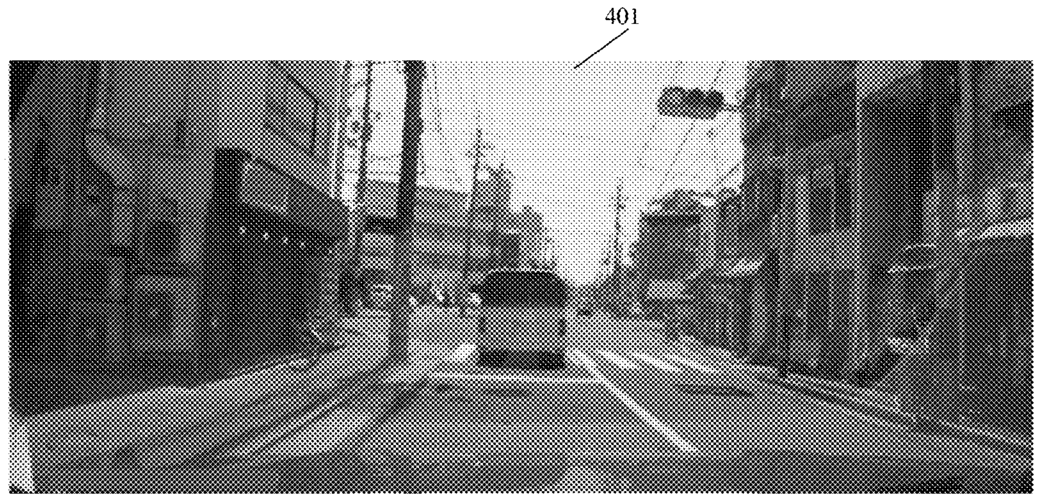
FIG. 4 is a schematic diagram of an application scenario of a method for detecting an anomalous object on a road according to embodiments of the present disclosure.
Figure 5:
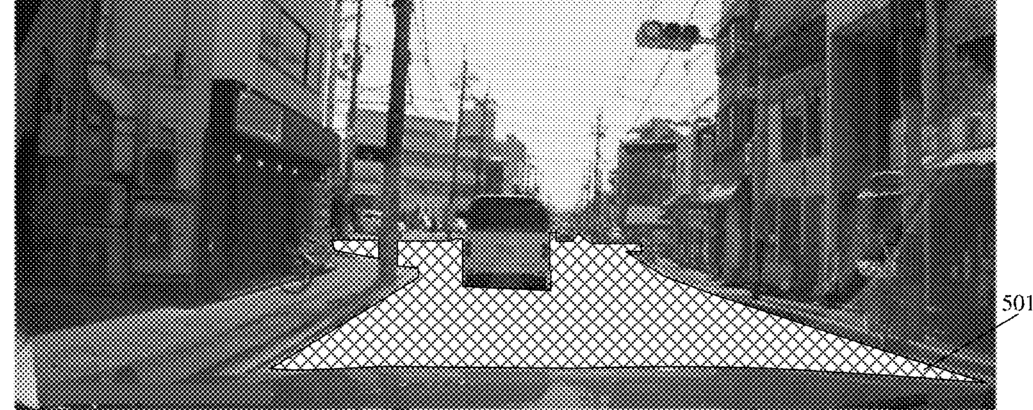
FIG. 5 is a schematic diagram of another application scenario of a method for detecting an anomalous object on a road according to embodiments of the present disclosure.
Figure 6:
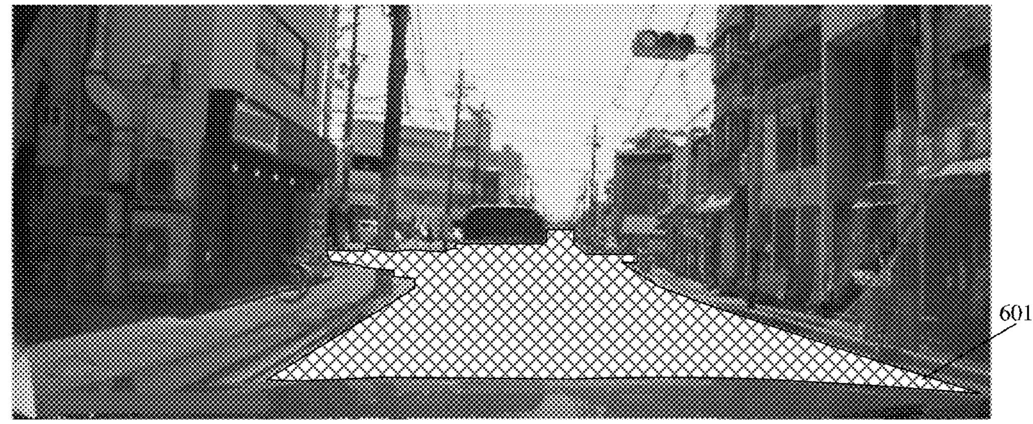
FIG. 6 is a schematic diagram of yet another application scenario of a method for detecting an anomalous object on a road according to embodiments of the present disclosure.

After semantic segmentation is performed on the acquired image of the road, a travelable region and an ideal travelable region in the image are determined. As shown in FIG. 4, the semantic segmentation is performed on an image of a road 401 to obtain the travelable region and the ideal travelable region of the road in the image. As shown in FIG. 5 and FIG. 6, the region 501 in FIG. 5 represents the travelable region, and the region 601 in FIG. 6 represents the ideal travelable region. By comparing the region 501 and the region 601, it can be seen that vehicles, pedestrians and some irregular anomalous objects are excluded from the travelable region, while for the ideal travelable region, all regions on which the vehicle can drive under the ideal state are identified. It can be seen that the main difference between the ideal travelable region and the travelable region lies in the identification of the anomalous objects.

Figure 7:
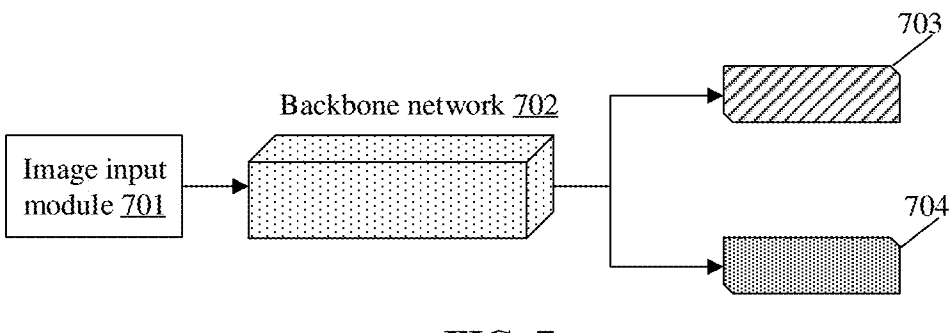
FIG. 7 is a diagram of a network structure of a method for detecting an anomalous object on a road according to embodiments of the present disclosure.

In some embodiments, in the process of automatic driving, the vehicle performs perception output according to the provided information on the road, and performs information synthesis on the result output from the model. As shown in FIG. 7, FIG. 7 is a diagram of a network structure of road sensing signal output according to embodiments of the present disclosure.

An image input module 701 is used for inputting an image of a road.

A backbone network 702 is used for performing feature extraction on the input image of the road.

Here, the backbone network may be a residual network, a VGG network, a GoogleNet network, or a ResNet network, or the like.

A travelable region branch network 703 is used for implementing a segmentation task, and performing semantic segmentation based on the extracted image features to output the travelable region.

In some possible implementations, the travelable region is segmented to output the travelable region by inputting image features extracted by the backbone network 702 into the travelable region branch network 703 that performs the semantic segmentation task.

In some possible implementations, since the roads all have similar textures, the travelable region branch network 703 will searches for an object that is similar to the road as the travelable region, the travelable region branch network 703 can generate a travelable region without an anomalous object. In this way, the travelable region can be robustly detected in the road region by the travelable region branch network 703.

An ideal travelable region branch network 704 is used for implementing a segmentation task, and performing semantic segmentation based on the extracted image features to output the ideal travelable region.

In some possible implementations, the ideal travelable region is segmented to output the ideal travelable region by inputting the image features extracted by the backbone network 702 into the ideal travelable region branch network 704 that performs the semantic segmentation task. The ideal travelable region branch network 704 identifies which regions are real road regions (which need to be identified even if there are anomalous objects on the road surface) and which regions are non-real road regions in the road region.

In some possible implementations, a region surrounded by the outermost contour in the image region input to the ideal travelable region branch network 704 is determined as an ideal region.

In some possible implementations, the ideal travelable region may be determined according to the travelable region, for example, a region surrounded by the outermost contour of the travelable region is determined as the ideal travelable region.

In some possible implementations, by performing lane detection on the image of the road, regions surrounded by lanes are determined as an ideal travelable region. In this way, the ideal travelable region can be determined based on the regions corresponding to the detected lanes and driving rules for the lanes of the road.

In some embodiments, after the travelable region and the ideal travelable region are determined by the travelable region branch network 703 and the ideal travelable region branch network 704, respectively, by comparing the results of the two regions, the overlapping region is determined as a real road region, a region where the two regions do not overlap (in most cases, the area of the ideal travelable region is larger than the area of the travelable region), i.e., a region that exists in the ideal travelable region but does not exist in the travelable region, is identified as an anomalous object region and output. In this way, vehicles, pedestrians, non-motor vehicles, and some anomalous objects with irregular shapes can be effectively identified.

In the embodiments of the present disclosure, the travelable region and the ideal travelable region can be effectively identified based on a deep learning model, where two learning tasks are concentrated into one network, and two branches share the same backbone network, which can not only accelerate the processing speed of the model, but also effectively reduce the pressure on the operating speed.

Those skilled in the art will understand that in the above-described method of the detailed embodiments, the written order of the various operations does not mean a strict execution order and does not constitute any limitation on the implementation process, and the specific execution order of the operations should be determined by their functions and possible internal logics.

Based on the same inventive concept, embodiments of the present disclosure further provides an apparatus for detecting an anomalous object on a road corresponding to the method for detecting an anomalous object on a road, and since the principle of solving a problem by the apparatus in the embodiment of the present disclosure is similar to the above-described method for detecting an anomalous object on a road in the embodiments of the present disclosure, implementations of the apparatus can refer to the implementations of the method.

Figure 8:
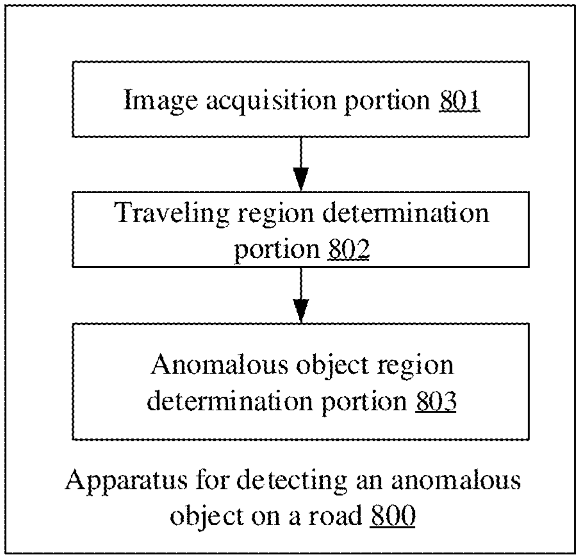
FIG. 8 is a schematic diagram of a structural composition of an apparatus for detecting an anomalous object on a road according to embodiments of the present disclosure.

An embodiment of the present disclosure provides an apparatus for detecting an anomalous object on a road. FIG. 8 is a schematic diagram of a structural composition of an apparatus for detecting an anomalous object on a road according to embodiments of the present disclosure. As shown in FIG. 8, the apparatus 800 for detecting the anomalous object on the road includes an image acquisition portion 801, a traveling region determination portion 802 and an anomalous object region determination portion 803.

The image acquisition portion 801 is configured to acquire an image of the road.

The traveling region determination portion 802 is configured to determine a travelable region and an ideal travelable region in the image of the road based on the image of the road.

The anomalous object region determination portion 803 is configured to determine an anomalous object region on the road based on the travelable region and the ideal travelable region.

In some embodiments, the traveling region determination portion 802 includes an image region identification sub-portion and a travelable region determination sub-portion.

The image region recognition sub-portion is configured to determine an image region, for which a similarity between a texture of the image region and characterization information of road texture is greater than a preset similarity threshold, in the image of the road.

The travelable region determination sub-portion is configured to determine the image region as the travelable region.

In some embodiments, the traveling region determination portion 802 includes a road edge identification sub-portion and a first ideal travelable region determination sub-portion.

The road edge identification sub-portion is configured to determine a road edge in the image of the road by detecting the image of the road.

The first ideal travelable region determination sub-portion is configured to determine a region surrounded by the road edge as the ideal travelable region.

In some embodiments, the traveling region determination portion 802 includes a second ideal travelable region determination sub-portion.

The second ideal travelable region determination sub-portion is configured to determine the ideal travelable region based on the travelable region.

In some embodiments, the second ideal travelable region determination sub-portion includes a contour determination portion, a target contour determination portion and an ideal travelable region determination portion.

The contour determination portion is configured to determine at least one contour of the travelable region.

The target contour determination portion is configured to determine a target contour whose surrounded region has a largest area among the at least one contour.

The ideal travelable region determination portion is configured to determine a region surrounded by the target contour as the ideal travelable region.

In some embodiments, the second ideal travelable region determination sub-portion is further configured to: determine that the region surrounded by the target contour comprises two road edges of the road.

In some embodiments, the traveling region determination portion 802 includes a lane detection sub-portion and a fourth ideal travelable region determination sub-portion.

The lane detection sub-portion is configured to obtain a plurality of lanes in the image of the road by detecting the image of the road.

The fourth ideal travelable region determination sub-portion is configured to determine the ideal travelable region based on the plurality of lanes and traffic rules corresponding to the plurality of lanes.

In some embodiments, the traveling region determination portion 802 is further configured to: obtain the travelable region and the ideal travelable region in the image of the road by performing semantic segmentation on the image of the road.

In some embodiments, the anomalous object region determination portion 803 includes a non-overlapping region determination sub-portion and an anomalous object region determination sub-portion.

The non-overlapping region determination sub-portion is configured to determine a non-overlapping region of the ideal travelable region that does not overlap with the travelable region.

The anomalous object region determination sub-portion is configured to determine the non-overlapping region as the anomalous object region.

In some embodiments, the apparatus further includes a traveling path determination portion and a vehicle controlling portion.

The traveling path determination portion is configured to determine a traveling path of a vehicle based on the anomalous object region.

The vehicle controlling portion is configured to determine control traveling of the vehicle based on the traveling path.

It should be noted that the above description of the apparatus embodiments is similar to the above description of the method embodiments, and has beneficial effects similar to those of the method embodiments. For technical details not disclosed in the apparatus embodiments of the present disclosure, please refer to the description of the method embodiments of the present disclosure for understanding.

In embodiments of the present disclosure and other embodiments, the "module" may be a circuit, a processor, a program, or software, or the like, or may be a unit, or may be non-modular.

It should be noted that, in the embodiments of the present disclosure, when the above-described method for detecting an anomalous object on the road is implemented in form of software function modules, and sold or used as a stand-alone product, it can be stored in a computer-readable storage medium. Based on such an understanding, the technical solutions of the embodiments of the present disclosure, or the contribution of the technical solutions to the related art, can be embodied in the form of a software product. The software product can be stored in a storage medium, and may include multiple instructions to cause a computer device (which may be a terminal, a server, etc.) to perform all or part of the methods described in the embodiments of the present disclosure. The storage medium may include various media that may store program codes, such as a U disk, a mobile hard disk, a Read-Only Memory (ROM), a magnetic disk, an optical disc, etc. As such, embodiments of the present disclosure are not limited to any particular combination of hardware and software.

Figure 9:
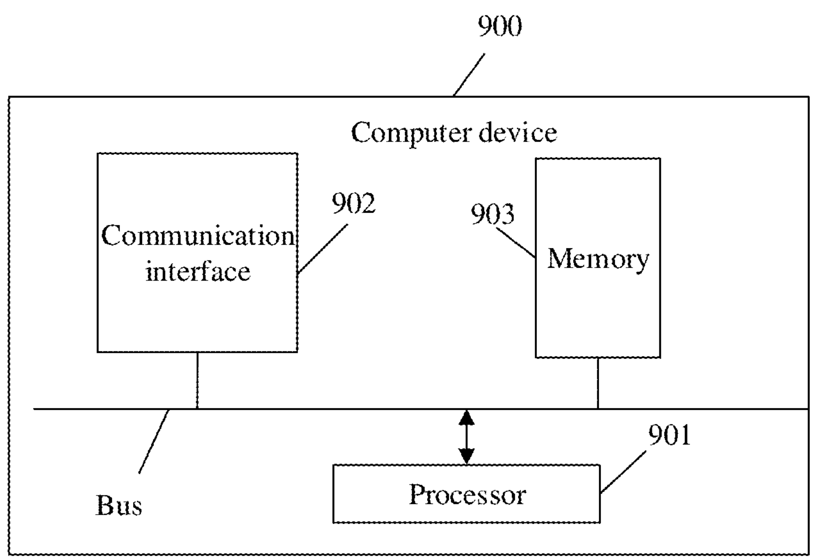
FIG. 9 is a schematic diagram of a structural composition of a computer device according to embodiments of the present disclosure.

Correspondingly, an embodiment of the present disclosure further provides a computer program product including computer-executable instructions that, when executed, cause to implement the operations in the method for detecting an anomalous object on a road provided by the embodiments of the present disclosure. Accordingly, an embodiment of the present disclosure further provides a computer storage medium having stored thereon computer-executed instructions that, when executed by a processor, cause to implement the operations in the method for detecting an anomalous object on a road provided by the above embodiments. Accordingly, an embodiment of the present disclosure provides a computer device. FIG. 9 is a schematic diagram of a structural composition of a computer device according to embodiments of the present disclosure. As shown in FIG. 9, the computer device 900 includes a processor 901, at least one communication bus, a communication interface 902, at least one external communication interface and a memory 903. The communication interface 902 is configured to implement the connection communication among these components. The communication interface 902 may include a display screen, and the external communication interface may include a standard wired interface and a standard wireless interface. The processor 901 is configured to execute the program for detecting an anomalous object on a road in the memory to implement the operations in the method for detecting an anomalous object on a road provided by the above embodiments.

Embodiments of the present disclosure provide a method and an apparatus for detecting an anomalous object on a road, a device and a storage medium. By detecting an acquired image of a road, a travelable region and an ideal travelable region in the image of the road are identified. By comparing the travelable region and the ideal travelable region, an anomalous object region where anomalous objects with any shape on the road are located can be effectively determined. In this way, by comparing the travelable region and the ideal travelable region, the anomalous object region on the road can be quickly identified, and the stability of identifying the anomalous objects with different shapes is improved.

The above description of the apparatus for detecting an anomalous object on a road, the computer device, and storage medium embodiments is similar to the description of the above method embodiments, and has similar technical description and beneficial effects with the corresponding method embodiments. Due to space limitations, reference may be made to the description of the above method embodiments, and thus the description thereof will not be repeated herein. Technical details not disclosed in the embodiments of the apparatus for detecting an anomalous object on a road, computer device, and storage medium of the present disclosure are understood with reference to the description of the method embodiments of the present disclosure. It is to be understood that the mentioned "one embodiment" or "an embodiment" throughout the specification mean that particular features, structures, or characteristics related to the embodiment are included in at least one embodiment of the present disclosure. Thus, appearances of "in one embodiment" or "in an embodiment" throughout the specification do not necessarily refer to the same embodiment. Furthermore, these particular features, structures, or characteristics may be incorporated in any suitable manner in one or more embodiments. It should be understood that in various embodiments of the present disclosure, a size of a sequence number of the above-mentioned processes does not mean an order of the execution. The execution order of various processes should be determined according to their functions and inherent logics, and should not constitute any limitation to the implementation process of the embodiments of the present disclosure. The above-described sequence numbers of the embodiments of the present disclosure are merely for description, and do not represent the advantages and disadvantages of the embodiments.

It should be noted that, herein, the terms "comprising", "including" or any other [00152] variation thereof are intended to encompass a non-exclusive inclusion, such that a process, a method, an article, or an apparatus that includes a series of elements includes not only those elements, but also other elements that are not explicitly listed, or elements inherent to such a process, method, article, or apparatus. Without further limitation, an element defined by the statement "comprising a" does not preclude the presence of additional identical elements in the process, method, article, or apparatus that includes the element.

In the embodiments of the present disclosure, it should be understood that the disclosed system, device and method may be implemented in other ways. For example, the device embodiments described above are merely illustrative. For example, the partitioning of the unit is merely a partitioning of logical function. Other partitioning mode may be adopted in practical implementation. For example, multiple units or components may be combined or integrated into another system, or some features may be ignored or not executed. In addition, the coupling, the direct coupling or the communication connection illustrated or discussed may be accomplished through some interfaces, and the indirect coupling or communication connection of devices or units may be electrical, mechanical or in other forms.

The units described above as separate components may or may not be physically separate, and the components displayed as units may or may not be physical units, that is, they may be located in one place or distributed over multiple network units. Some or all of the units can be selected according to practical needs to achieve the purpose of the embodiment. In addition, in the embodiments of the present disclosure, various function units may be integrated into one processing unit, or each unit may be separately used as one unit, or two or more units may be integrated into one unit. The above integrated units may be implemented in the form of hardware or in the form of hardware plus software functional units. A person having ordinary skill in the art will understand that all or part of the operations for implementing the above-described method embodiments can be completed by hardware related to program instructions. The aforementioned program can be stored in a computer-readable storage medium that, when executed, performs the operations including the above-described method embodiments. The aforementioned storage medium includes various media that may store program codes, such as a mobile storage device, a Read Only Memory (ROM), a magnetic disk, an optical disc, etc.

Alternatively, when the integrated units of the present disclosure are implemented in the form of software function modules and sold or used as a stand-alone product, they can also be stored in a computer-readable storage medium.

Based on such an understanding, the technical solutions of the embodiments of the present disclosure, or the contribution of the technical solutions to the related art, can be embodied in the form of a software product. The software product can be stored in a storage medium, and may include multiple instructions to cause a computer device (which may be a personal computer, a server, a network device, etc.) to perform all or part of the methods described in the embodiments of the present disclosure. The storage medium may include various media that may store program codes, such as a mobile storage device, a ROM, a magnetic disk, an optical disc, etc. The foregoing are only specific embodiments of the disclosure, however, the scope of protection of the disclosure is not limited thereto. Variations and substitutions which may be readily conceived by those skilled in the art within the technical scope disclosed in the disclosure should fall within the scope of protection of the disclosure. Therefore, the scope of protection of the disclosure should conform to the scope of protection of the appended claims.

The invention claimed is:

1. A method for detecting an anomalous object on a road, performed by an electronic device, the method comprising:
- acquiring an image of the road;
- determining a travelable region in the image of the road based on the image of the road;
- determining an ideal travelable region in the image of the road based on contours of the travelable region by:
  - determining at least one contour of the travelable region;
  - selecting, from the at least one contour, a target contour whose surrounded region has a largest area; and
  - determining a region surrounded by the target contour as the ideal travelable region;
- determining an anomalous object region on the road based on the travelable region and the ideal travelable region by:
  - electronically comparing the ideal travelable region with the travelable region to identify a non-overlapping region that exists in the ideal travelable region but is absent from the travelable region; and
  - setting the non-overlapping region as the anomalous object region;
- determining a traveling path of a vehicle based on the anomalous object region; and
- generating a control signal for controlling navigation of the vehicle based on the traveling path.

2. The method of claim 1, wherein determining the travelable region comprises:
- determining an image region for which a similarity between a texture of the image region and characterization information of road texture is greater than a preset similarity threshold; and
- determining the image region as the travelable region.

3. The method of claim 1, wherein before determining the region surrounded by the target contour as the ideal travelable region, the method further comprises:
- determining that the region surrounded by the target contour comprises two road edges of the road.

4. The method of claim 1, further comprising
- causing a display device to display the anomalous object region.

5. The method of claim 1, wherein determining the travelable region and the ideal travelable region comprises performing semantic segmentation on the image of the road.

6. An apparatus for detecting an anomalous object on a road, the apparatus comprising:
- a processor; and
- a memory configured to store instructions executable by the processor, wherein the processor is configured to:
  - acquire an image of the road;
  - determine a travelable region in the image of the road based on the image of the road;
  - determine an ideal travelable region in the image of the road based on contours of the travelable region by:
    - determining at least one contour of the travelable region;
    - selecting, from the at least one contour, a target contour whose surrounded region has a largest area; and
    - determining a region surrounded by the target contour as the ideal travelable region;
- determine an anomalous object region on the road based on the travelable region and the ideal travelable region by electronically comparing the ideal travelable region with the travelable region to identify a non-overlapping region that exists in the ideal travelable region but is absent from the travelable region, and setting the non-overlapping region as the anomalous object region;
- determine a traveling path of a vehicle based on the anomalous object region; and
- generate a control signal for controlling navigation of the vehicle based on the traveling path.

7. The apparatus of claim 6, wherein the processor is further configured to:
- determine an image region for which a similarity between a texture of the image region and characterization information of road texture is greater than a preset similarity threshold; and
- determine the image region as the travelable region.

8. The apparatus of claim 6, wherein before determining the region surrounded by the target contour as the ideal travelable region, the processor is further configured to:
- determine that the region surrounded by the target contour comprises two road edges of the road.

9. The apparatus of claim 6, wherein the processor is further configured to:
- obtain the travelable region by performing semantic segmentation on the image of the road.

10. The apparatus of claim 6, wherein the processor is further configured to:
- cause a display device to display the anomalous object region.

11. A non-transitory computer storage medium having stored thereon computer-executed instructions that, when executed by a computer, cause the computer to implement the following:
- acquiring an image of a road;
- determining a travelable region in the image of the road based on the image of the road;
- determining an ideal travelable region in the image of the road based on contours of the travelable region by:
  - determining at least one contour of the travelable region;
  - selecting, from the at least one contour, a target contour whose surrounded region has a largest area; and
  - determining a region surrounded by the target contour as the ideal travelable region;
- determining an anomalous object region on the road based on the travelable region and the ideal travelable region by:
  - electronically comparing the ideal travelable region with the travelable region to identify a non-overlapping region that exists in the ideal travelable region but is absent from the travelable region; and setting the non-overlapping region as the anomalous object region;

determining a traveling path of a vehicle based on the anomalous object region; and generating a control signal for controlling navigation of the vehicle based on the traveling path.

* * * * *